Sept. 18, 1934.   F. NORD   1,974,289
ANIMAL TRAP
Filed May 28, 1934
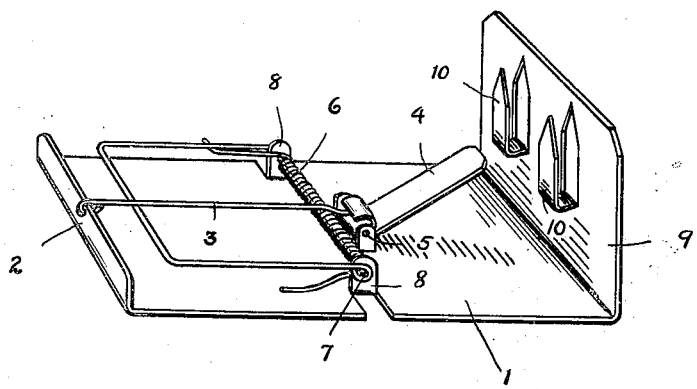
INVENTOR.
Fred Nord.
BY
Geo. Stevens.
ATTORNEY.

Patented Sept. 18, 1934

1,974,289

UNITED STATES PATENT OFFICE 1,974,289

ANIMAL TRAP

Fred Nord, South Range, Wis.

Application May 28, 1934, Serial No. 727,868

3 Claims. (Cl. 43—81)

This invention relates to animal traps, and has special reference to such a device for the catching and killing of small vermin, such as mice, moles, or the like.

The principal object of the invention is to provide means whereby to insure the killing as well as the catching of such small animals.

It is not the intention to claim any novelty respecting the arrangement of trigger, holding or killing bars, as the same differs in no material respect from the common simple mouse trap, but the principal feature of the invention resides in the shield-like upstanding forward end of the body member of the trap, and which is provided with bait holding means. As will be apparent this novel construction avoids the necessity of placing bait on the trigger of the trap, but rather holds the bait suspended adjacent to the free end of the trigger where it is practically impossible for a small animal to remove the bait without in some manner engaging the trigger, and, thus being substantially confined in such area, ideally positioned for the most effective blow of the killing bar when same is released.

The illustration accompanying this application and forming part thereof is a perspective view of a trap embodying the invention.

In this embodiment, the base portion of the trap is illustrated as being constructed of sheet metal indicated at 1, while the rear end of the base portion is turned upwardly at right angles as at 2, forming a convenient means for attachment of the holding bar 3 as well as stiffening the rear end of the body portion transversely.

The trigger is illustrated at 4, and is of the common type, pivotally mounted as at 5 in lugs struck upwardly from the base portion. The expansive helical spring 6 is mounted upon the transverse rod 7 also mounted within lugs 8 struck up from the body of the trap, while at the front end of the trap there is a material portion of the body turned up at right angles as at 9. In this upwardly turned end of the trap there are struck inwardly therefrom the sharpened bait holding tines 10, of which there may be any desired number. Upon these tines as well as between them and the shield 9 the bait may be placed as by pressure, or otherwise attached in any manner so that any attempt by an animal especially of the smaller type to reach the bait will necessitate it in some manner to encounter and disturb the trigger 4 which will spring the trap and invariably kill the animal.

Having thus described my invention, what I claim and desire to secure by Letters Patent, is:

1. An animal trap of the type described comprising a single sheet metal base portion, bent upwardly at right angles at each end, a trigger and killing bar mounted upon said base portion, a trigger holding bar pivotally mounted in one upturned end of the body portion, and bait holding tines pressed inwardly from the other end of the body portion.

2. An animal trap of the type described comprising a single sheet metal base portion and carrying a trigger, trigger bar and killing bar, characterized by one end of the trap being bent upwardly and carrying inwardly extending bait holding means.

3. An animal trap of the type described comprising a single sheet metal base portion bent upwardly at each end, lugs pressed upwardly from the body portion, a trigger and a killing bar supported in said lugs, a trigger bar pivotally mounted in one upturned end, and inwardly extending bait holding means carried by the other upturned end.

FRED NORD.